United States Patent
Kim et al.

(10) Patent No.: US 11,092,467 B2
(45) Date of Patent: Aug. 17, 2021

(54) ELASTIC ENCODER AND MANUFACTURING METHOD THEREOF

(71) Applicant: STM CORPORATION, Daegu (KR)

(72) Inventors: Jun Woo Kim, Daegu (KR); Se Hoon Kim, Changwon-si (KR); Su Won Cho, Daegu (KR)

(*) Notice: Subject to any disclaimer, the term of this patent is extended or adjusted under 35 U.S.C. 154(b) by 309 days.

(21) Appl. No.: 16/175,194

(22) Filed: Oct. 30, 2018

(65) Prior Publication Data
US 2020/0132518 A1 Apr. 30, 2020

(51) Int. Cl.
*G01D 11/24* (2006.01)
*H01F 1/42* (2006.01)
*H01F 7/02* (2006.01)
*H01F 41/00* (2006.01)
*G01D 5/245* (2006.01)
*B29C 48/00* (2019.01)
*B29L 31/00* (2006.01)

(52) U.S. Cl.
CPC ........ *G01D 11/245* (2013.01); *B29C 48/0011* (2019.02); *B29C 48/0022* (2019.02); *G01D 5/2451* (2013.01); *H01F 1/42* (2013.01); *H01F 7/0294* (2013.01); *H01F 41/00* (2013.01); *B29K 2995/0008* (2013.01); *B29L 2031/7096* (2013.01)

(58) Field of Classification Search
CPC .... B29C 48/0011; B29C 48/0022; H01F 1/42
See application file for complete search history.

(56) References Cited

U.S. PATENT DOCUMENTS

| | | | |
|---|---|---|---|
| 2003/0034772 A1* | 2/2003 | Galvan | G01P 3/487 324/174 |
| 2007/0152657 A1* | 7/2007 | Yabe | G01P 3/443 324/174 |
| 2010/0001717 A1* | 1/2010 | Tomioka | G01D 5/2457 324/207.11 |
| 2015/0128989 A1* | 5/2015 | Sakuma | B22D 11/0611 134/1 |
| 2016/0091023 A1* | 3/2016 | Shiono | F16C 19/186 384/480 |
| 2016/0245409 A1* | 8/2016 | Kato | F16C 41/007 |

\* cited by examiner

*Primary Examiner* — Alvaro E Fortich
(74) *Attorney, Agent, or Firm* — Bakerhostetler LLP; Mark H. Krietzman

(57) ABSTRACT

Disclosed herein are an elastic encoder and manufacturing method thereof. The elastic encoder of the present invention includes a reinforcing rim which has a reinforcing body and a reinforcing flange formed along a peripheral part of the reinforcing body and which is manufactured using a metallic material; and a plastic magnet which is bound to the reinforcing flange so as to surround the reinforcing flange, includes synthetic resin, rubber material, and magnetic powder, and has a plurality of magnetic poles magnetized in a circumferential direction.

12 Claims, 12 Drawing Sheets

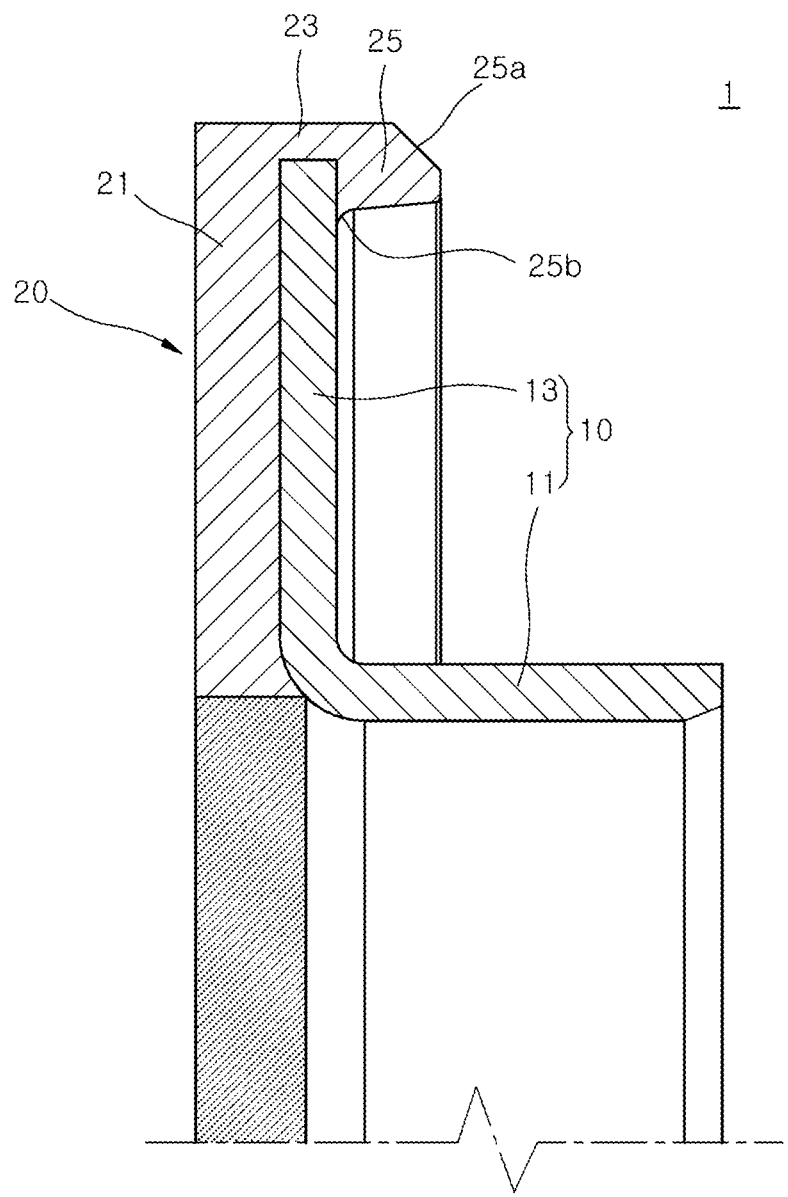

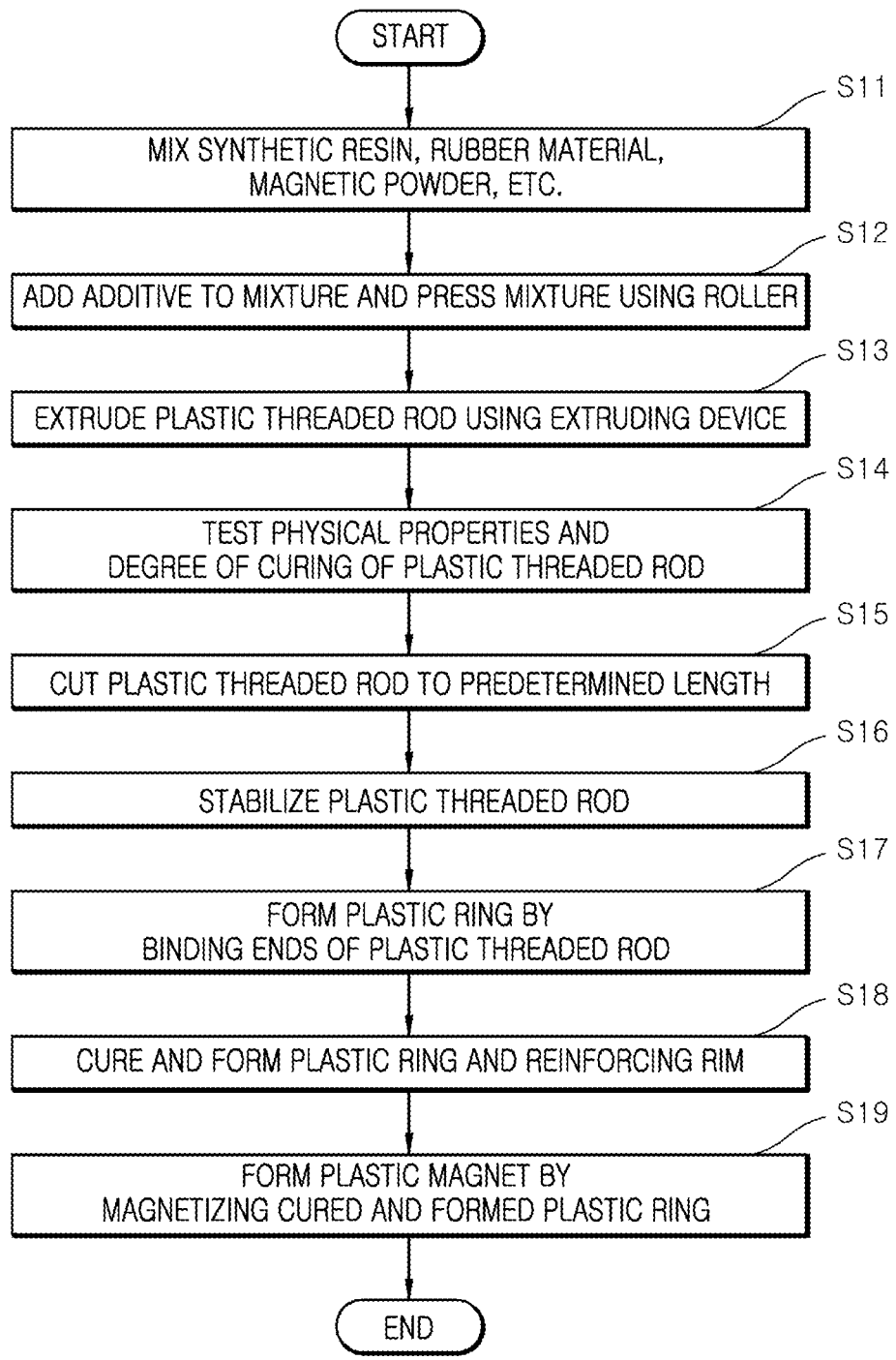

FIG. 11

| NO | Air gap : 1mm | | | | | | Air gap : 2.13mm | | | | | |
|---|---|---|---|---|---|---|---|---|---|---|---|---|
| | Flux density (-) | | | Flux density (+) | | | SPD(+) Before | SPD(+) After | SPD(-) Before | SPD(-) After | TPD Before | TPD After |
| | Min[mT] Before | Min[mT] After | Deviation | Min[mT] Before | Min[mT] After | Deviation | | | | | | |
| #1 | -23.43 | -23.12 | -1.3% | 23.65 | 23.33 | -1.4% | 0.51 | 0.69 | -0.68 | -0.75 | 1.85 | 1.98 |
| #2 | -26.03 | -25.67 | -1.4% | 25.95 | 25.71 | -0.9% | 0.84 | 0.88 | -1.06 | -1.11 | 2.12 | 2.33 |
| #3 | -26.69 | -26.44 | -0.9% | 26.06 | 25.75 | -1.2% | 0.62 | 0.63 | -0.82 | -0.77 | 2.29 | 2.42 |
| #4 | -23.71 | -23.93 | 0.9% | 23.95 | 24.12 | 0.7% | 0.72 | 0.81 | -1.23 | -1.34 | 2.11 | 2.26 |
| #5 | -24.49 | -24.15 | -1.4% | 24.83 | 24.55 | -1.1% | 1.03 | 1.12 | -1.56 | -1.61 | 2.89 | 3.02 |
| #6 | -24.26 | -23.83 | -1.8% | 24.38 | 24.04 | -1.4% | 0.88 | 0.78 | -0.97 | -1.05 | 2.55 | 2.68 |
| SPEC | min 15mT | | | | | | ≤±2 % | | | | max 5% | |
| Result | PASS | | | | | | PASS | | PASS | | PASS | |

FIG. 12

| Item | | Air gap : 1mm | | | | | | | Air gap : 2.13mm | | | | | |
|---|---|---|---|---|---|---|---|---|---|---|---|---|---|---|
| | | Flux density (-) | | | Flux density (+) | | | | | | | | | |
| Test | NO | Min[mT] Before | Min[mT] After | Deviation | Min[mT] Before | Min[mT] After | Deviation | SPD(+) Before | SPD(+) After | SPD(-) Before | SPD(-) After | TPD Before | TPD After |
| Temperature Shock | #7 | −24.53 | −24.21 | −1.3% | 24.15 | 23.95 | −0.8% | 1.64 | 1.71 | −1.66 | −1.78 | 2.31 | 2.43 |
| | #8 | −23.82 | −23.61 | −0.9% | 23.88 | 23.77 | −0.5% | 0.87 | 0.91 | −0.75 | −0.82 | 1.16 | 1.22 |
| | #9 | −24.34 | −24.14 | −0.8% | 24.21 | 23.87 | −1.4% | 0.83 | 0.93 | −1.11 | −1.19 | 1.94 | 2.05 |
| | #10 | −25.22 | −25.05 | −0.7% | 25.14 | 25.01 | −0.5% | 1.28 | 1.45 | −1.33 | −1.45 | 2.45 | 2.51 |
| | #11 | −26.34 | −26.20 | −0.5% | 26.43 | 26.12 | −1.2% | 0.92 | 1.21 | −0.93 | −1.04 | 1.76 | 1.79 |
| | #12 | −25.35 | −25.03 | −1.3% | 25.33 | 25.41 | 0.3% | 1.33 | 1.36 | −0.93 | −1.07 | 1.72 | 2.05 |
| High temperature test | #7 | −24.21 | −24.11 | −0.4% | 23.95 | 23.73 | −0.9% | 1.71 | 1.86 | −1.78 | −1.95 | 2.43 | 2.71 |
| | #8 | −23.61 | −23.45 | −0.7% | 23.77 | 23.84 | 0.3% | 0.91 | 0.99 | −0.82 | −0.89 | 1.22 | 1.34 |
| | #9 | −24.14 | −23.72 | −1.7% | 23.87 | 23.69 | −0.8% | 0.93 | 1.12 | −1.19 | −1.35 | 2.05 | 2.13 |
| | #10 | −25.05 | −24.93 | −0.5% | 25.01 | 24.91 | −0.4% | 1.45 | 1.44 | −1.45 | −1.87 | 2.51 | 2.82 |
| | #11 | −26.20 | −26.01 | −0.7% | 26.12 | 25.89 | −0.9% | 1.21 | 1.39 | −1.04 | −1.26 | 1.79 | 2.15 |
| | #12 | −25.03 | −24.86 | −0.7% | 25.41 | 25.21 | −0.8% | 1.36 | 1.35 | −1.07 | −1.77 | 2.05 | 2.64 |
| Low temperature testing | #7 | −24.11 | −24.21 | 0.4% | 23.73 | 23.85 | 0.5% | 1.86 | 1.85 | −1.95 | −1.94 | 2.71 | 2.57 |
| | #8 | −23.45 | −23.63 | 0.8% | 23.84 | 23.81 | −0.1% | 0.99 | 1.05 | −0.89 | −0.98 | 1.34 | 1.56 |
| | #9 | −23.72 | −23.75 | 0.1% | 23.69 | 23.61 | −0.3% | 1.12 | 1.36 | −1.35 | −1.55 | 2.13 | 2.53 |
| | #10 | −24.93 | −24.88 | −0.2% | 24.91 | 24.99 | 0.3% | 1.44 | 1.32 | −1.87 | −1.77 | 2.82 | 2.84 |
| | #11 | −26.01 | −25.94 | −0.3% | 25.89 | 25.76 | −0.5% | 1.39 | 1.54 | −1.26 | −1.32 | 2.15 | 2.62 |
| | #12 | −24.86 | −24.92 | 0.2% | 25.21 | 25.33 | 0.5% | 1.35 | 1.33 | −1.77 | −1.65 | 2.64 | 2.54 |
| SPEC | | min 15mT | | | | | | PASS | | ≤±2 % | | max 5% | |
| Result | | PASS | | | | | | | | PASS | | PASS | |

ELASTIC ENCODER AND MANUFACTURING METHOD THEREOF

BACKGROUND

Field of the Invention

The present invention relates to an elastic encoder and manufacturing method thereof, and more particularly, to an elastic encoder capable of increasing a binding force and preventing cracks or damages and a manufacturing method thereof.

Discussion of Related Art

Generally, an encoder refers to a device that detects a displacement, a direction of rotation, an angle, and the like. A roller bearing is installed in a wheel shaft of a vehicle, and an encoder is installed in a rotating race of the roller bearing. The number of rotations or direction of rotation of a wheel is detected by installing an encoder in a wheel bearing.

An encoder installed in a wheel of a vehicle includes a back plate and a plastic magnet which is formed in a ring shape and bound to a rear surface of the back plate by curing. A plurality of protrusions are formed in a circumferential direction in the plastic magnet, and a plurality of hole parts are formed in the back plate for the plurality of protrusions to be inserted thereinto. As the protrusions are fitted into the hole parts, the plastic magnet and the back plate are stably adhered to each other.

However, in the conventional case, since the back plate is formed of a metallic material while the magnet is formed of a plastic material, it is difficult to tightly bind the back plate and the magnet which are formed of different materials. In addition, since the plastic magnet is formed to have a small thickness, the plastic magnet may be damaged due to an external impact.

In addition, since the protrusions of the plastic magnet are inserted into the hole parts of the back plate, the protrusions are disposed to protrude from the back plate. Therefore, it is difficult to install a sealing member at one surface of the back plate, and foreign substances such as water or dust may be infiltrated into the wheel bearing.

SUMMARY OF THE INVENTION

The present invention has been devised to improve the above problems, and the present invention is directed to providing an elastic encoder capable of increasing a binding force and preventing cracks or damages and a manufacturing method thereof.

An elastic encoder according to the present invention includes a reinforcing rim which has a reinforcing body and a reinforcing flange formed along a peripheral part of the reinforcing body and which is manufactured using a metallic material; and a plastic magnet which is bound to the reinforcing flange so as to surround the reinforcing flange, includes synthetic resin, rubber material, and magnetic powder, and has a plurality of magnetic poles magnetized in a circumferential direction.

The reinforcing body may be formed in an annular shape, and the reinforcing flange may extend in a radial direction from an outer surface of the reinforcing body and may be formed in an annular shape so as to be concentric with the reinforcing body.

The plastic magnet may be bound to one surface and a corner part of the reinforcing flange, and the corner part of the reinforcing flange may be buried in the plastic magnet.

The plastic magnet may include one surface binding part bound to one surface of the reinforcing flange, a corner binding part which extends from the one surface binding part and is bound to a corner part of the reinforcing flange, and an other surface binding part which extends from the corner binding part toward the reinforcing body so that the corner part of the reinforcing flange is buried therein.

An inclined surface part may be formed at an outer surface of the other surface binding part so that a width of the inclined surface part progressively narrows toward an end of the other surface binding part, and an adhering part, whose thickness progressively decreases toward the reinforcing body, may be formed at an inner surface of the other surface binding part so that the adhering part is adhered to the other surface of the reinforcing flange.

The plastic magnet may be formed by extruding a plastic ring, cutting the extruded plastic ring to a predetermined length, binding ends of the cut plastic ring to form an annular shape, placing the annular plastic ring at an upper side of the reinforcing flange, and pressing the annular plastic ring using a mold to bind the annular plastic ring to the reinforcing flange.

A plurality of magnetic poles may be magnetized in the plastic magnet due magnetic field anisotropy.

A plurality of magnetic poles may be magnetized in the plastic magnet due to mechanical anisotropy.

The rubber material may include one or more of natural rubber (NR), nitrile butadiene rubber (NBR), styrene butadiene rubber (SBR), ethylene propylene diene monomer (EPDM), acrylic rubber (ACM), acrylic ethylene rubber (AEM), ethylene propylene rubber (EPM), fluorocarbon rubber (FPM), fluoro rubber (FKM), vinyl methyl silicone rubber (VMQ), epichlorohydrin rubber (ECO), polyester urethane (PU), hydrogenated nitrile butadiene rubber (HNBR), chloroprene rubber (CR), and chloro sulfonated polyethylene rubber (CSM).

A method of manufacturing an elastic encoder according to the present invention includes mixing synthetic resin, rubber material, and magnetic powder; extruding a plastic threaded rod using an extruding device; cutting the plastic threaded rod in a circumferential length of a reinforcing rim; forming a plastic ring by binding ends of the plastic threaded rod; curing and forming the plastic ring and the reinforcing rim using a mold; and forming a plastic magnet by magnetizing the plastic ring cured and formed in the reinforcing rim.

A corner part of the reinforcing flange of the reinforcing rim may be buried in the plastic magnet.

The plastic magnet may include one surface binding part bound to one surface of the reinforcing flange, a corner binding part which extends from the one surface binding part and is bound to a corner part of the reinforcing flange, and an other surface binding part which extends from the corner binding part toward the reinforcing body so that the corner part of the reinforcing flange is buried therein.

An inclined surface part may be formed at an outer surface of the other surface binding part so that a width of the inclined surface part progressively narrows toward an end of the other surface binding part, and an adhering part, whose thickness progressively decreases toward the reinforcing body, may be formed at an inner surface of the other surface binding part so that the adhering part is adhered to the other surface of the reinforcing flange.

A plurality of magnetic poles may be magnetized in the plastic magnet due to magnetic field anisotropy.

A plurality of magnetic poles may be magnetized in the plastic magnet due to mechanical anisotropy.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 5 is an enlarged cross-sectional view illustrating the elastic encoder according to an embodiment of the present invention;

FIG. 6 is a flowchart illustrating a method of manufacturing an elastic encoder according to an embodiment of the present invention;

FIG. 11 is a graph illustrating output characteristics and pitch variations of an elastic encoder according to an embodiment of the present invention; and FIG. 12 is a graph illustrating output characteristics and pitch variations of an elastic encoder on which a heat resistance experiment is performed according to an embodiment of the present invention.

DETAILED DESCRIPTION OF EXEMPLARY EMBODIMENTS

Figure 1:
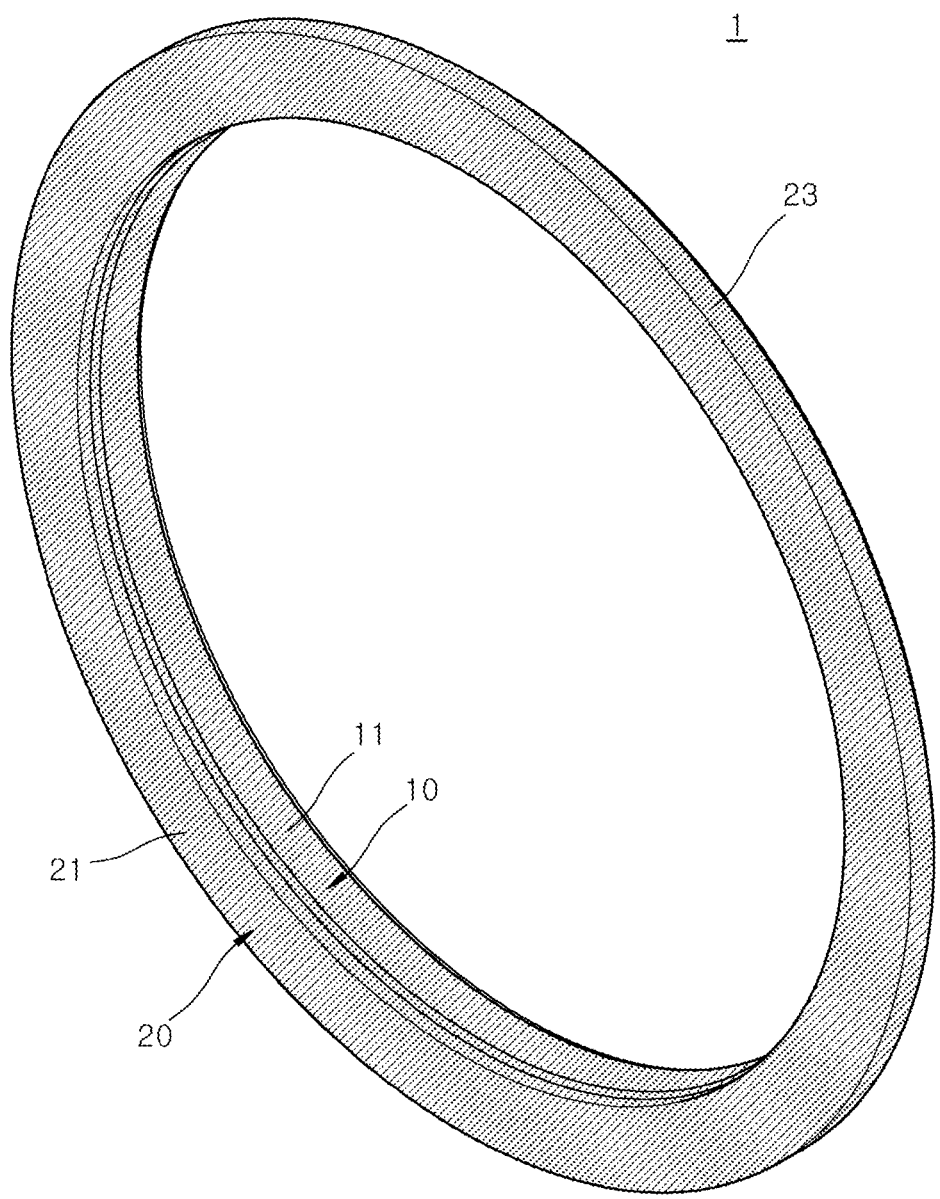
FIG. 1 is a perspective view illustrating an upper side of an elastic encoder according to an embodiment of the present invention.

Hereinafter, an elastic encoder and manufacturing method thereof according to the present invention will be described with reference to the accompanying drawings. In the process of describing the elastic encoder and manufacturing method thereof, the thickness of lines, sizes of elements, or the like illustrated in the drawings may have been exaggerated for clarity and convenience of description. The terms which will be mentioned below are terms defined in consideration of functions in the present invention, and the terms may be vary according to intentions or practices of a user or an operator. Therefore, such terms should be defined on the basis of content throughout the present specification.

Figure 2:
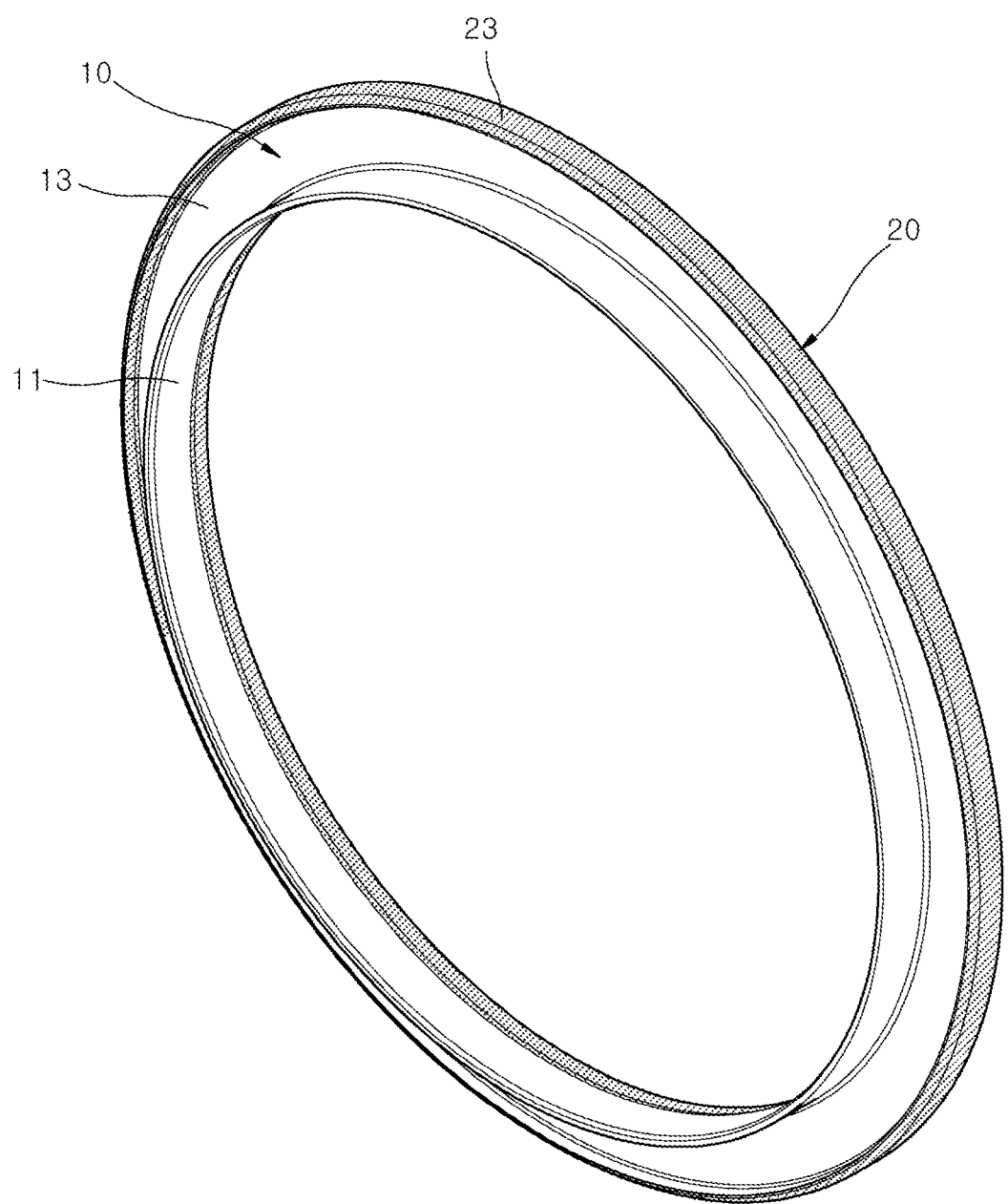
FIG. 2 is a perspective view illustrating a lower side of the elastic encoder according to an embodiment of the present invention.
Figure 3:
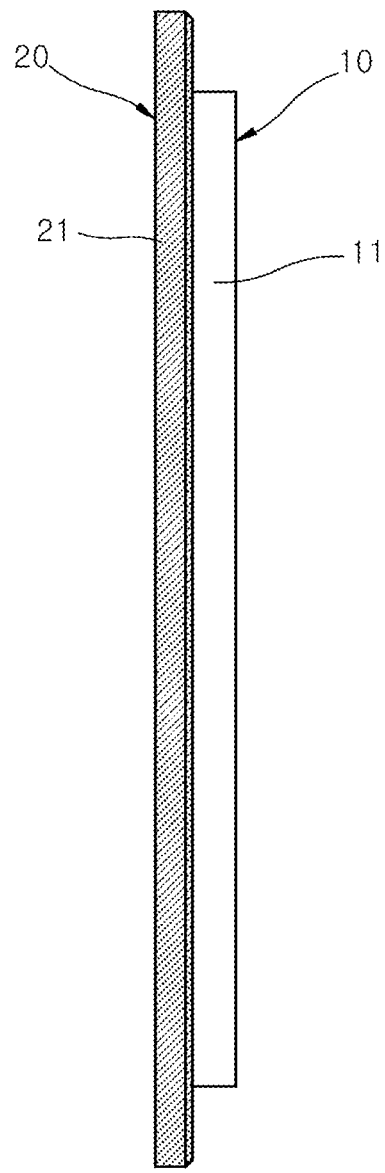
FIG. 3 is a side view illustrating the elastic encoder according to an embodiment of the present invention.
Figure 4:
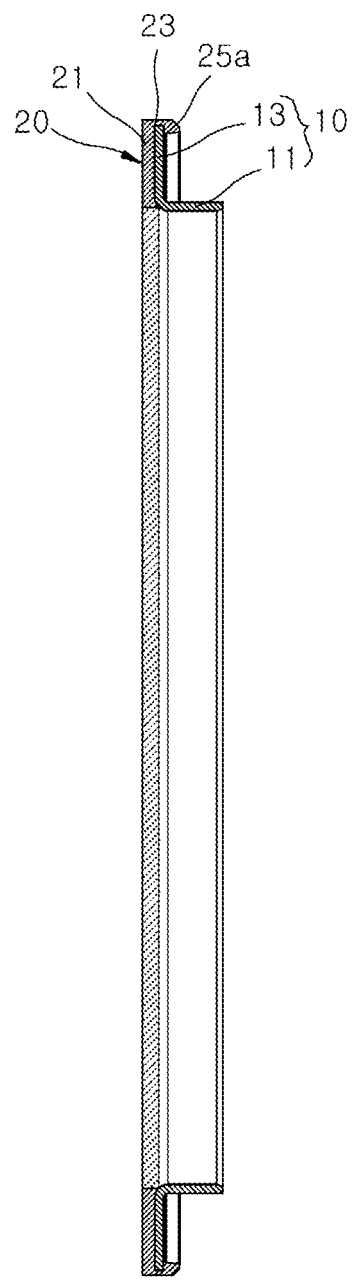
FIG. 4 is a cross-sectional view illustrating the elastic encoder according to an embodiment of the present invention.

FIG. 1 is a perspective view illustrating an upper side of an elastic encoder according to an embodiment of the present invention, FIG. 2 is a perspective view illustrating a lower side of the elastic encoder according to an embodiment of the present invention, FIG. 3 is a side view illustrating the elastic encoder according to an embodiment of the present invention, FIG. 4 is a cross-sectional view illustrating the elastic encoder according to an embodiment of the present invention, and FIG. 5 is an enlarged cross-sectional view illustrating the elastic encoder according to an embodiment of the present invention.

Referring to FIGS. 1 to 5, an elastic encoder 1 according to an embodiment of the present invention includes a reinforcing rim 10 and a plastic magnet 20.

The reinforcing rim 10 has a reinforcing body 11 and a reinforcing flange 13. The reinforcing rim 10 is manufactured using a metallic material. The reinforcing body 11 is formed in an annular shape. The reinforcing flange 13 is formed along a peripheral part of the reinforcing body 11. The reinforcing flange 13 extends in a radial direction from an outer surface of the reinforcing body 11 and is formed in an annular shape so as to be concentric with the reinforcing body 11. The reinforcing flange 13 is formed to be perpendicular to the reinforcing body 11. A width of the reinforcing body 11 is parallel with an axial direction of a wheel bearing (not illustrated), and a width of the reinforcing flange 13 is perpendicular to the axial direction of the wheel bearing. Since the reinforcing flange 13 is formed in an annular shape so as to be concentric with the reinforcing body 11, the reinforcing flange 13 is disposed to be coaxial with a driving shaft of the vehicle.

The plastic magnet 20 is bound to the reinforcing flange 13 so as to surround the reinforcing flange 13 and includes synthetic resin, rubber material, and magnetic powder. A plurality of magnetic poles are magnetized in a circumferential direction in the plastic magnet 20. In this case, N-poles and S-poles are alternately formed in the plastic magnet 20. Since the plastic magnet 20 is bound to the reinforcing flange 13 and the plastic magnet 20 is coaxial with the axial direction of the wheel bearing, a speed of rotation of the driving shaft may be measured by detecting the magnetic poles of the plastic magnet 20. The composition of the plastic magnet 20 will be described in detail below.

Since the flexible plastic magnet 20 is bound to the reinforcing flange 13, an interface binding force of the plastic magnet 20 may be improved. Therefore, a binding force between the plastic magnet 20 and the reinforcing flange 13 may be improved. In addition, since the other surface of the reinforcing flange 13 is smoothly formed, infiltration of foreign substances into the wheel bearing may be prevented by installing a sealing member (not illustrated) at the other surface of the reinforcing flange 13.

The plastic magnet 20 is bound to one surface and a corner part of the reinforcing flange 13, and the corner part of the reinforcing flange 13 is buried in the plastic magnet 20. Since the plastic magnet 20 is bound to one surface and the corner part of the reinforcing flange 13 and the corner part of the reinforcing flange 13 is buried in the plastic magnet 20, the plastic magnet 20 may be tightly adhered and bound to the reinforcing flange 13. Therefore, contact surfaces of the reinforcing flange 13 and the plastic magnet 20, which are formed of different materials, may be prevented from being detached or spaced apart due to different thermal expansion coefficients.

The plastic magnet 20 includes one surface binding part 21, a corner binding part 23, and an other surface binding part 25. The one surface binding part 21 is bound to one surface of the reinforcing flange 13. The one surface binding part 21 is formed to be parallel with the reinforcing flange 13. The corner binding part 23 is connected to the one surface binding part 21 and bound to the corner part of the reinforcing flange 13. The corner binding part 23 is formed to be perpendicular to the one surface binding part 21. The other surface binding part 25 extends from the corner binding part 23 toward the reinforcing body 11 so that the corner part of the reinforcing flange 13 is buried therein. The corner part of the reinforcing flange 13 is buried between the other surface binding part 25, the corner binding part 23, and the one surface binding part 21. Since the corner binding part 23 and the other surface binding part 25 are formed in a ring shape so as to surround the entire corner part of the reinforcing flange 13, an outer portion of the plastic magnet 20 can be prevented from being spaced apart from the corner part of the reinforcing flange 13.

An inclined surface part 25a is formed at an outer surface of the other surface binding part 25 so that a width of the inclined surface part 25a progressively narrows toward an end of the other surface binding part 25, and an adhering part 25b, whose thickness progressively decreases toward the reinforcing body 11, is formed at an inner surface of the other surface binding part 25 so that the adhering part 25b is adhered to the other surface of the reinforcing flange 13. Since the inclined surface part 25a, whose width progressively narrows toward the end of the other surface binding part 25, is formed, the plastic magnet 20 may be easily separated from a lower mold 110 (see FIG. 7) after being formed in the lower mold 110. In addition, since the adhering part 25b is formed to have a thickness which progressively decreases toward the reinforcing body 11, the adhering part 25b may be easily stretched when thermal expansion variations occur between the reinforcing flange 13 and the plastic magnet 20 as the stretch of the adhering part 25b increases in comparison to other portions.

The plastic magnet 20 is formed by extruding a plastic threaded rod 20a, cutting the extruded plastic threaded rod 20a to a predetermined length, binding ends 20b of the cut plastic threaded rod 20a to form an annular plastic ring 20a, placing the annular plastic ring 20a at an upper side of the reinforcing flange 13, and pressing the annular plastic ring 20a using molds 110 and 120 to bind the annular plastic ring 20a to the reinforcing flange 13. Since the plastic ring 20a is a configuration formed in an annular shape by binding the ends 20b of the plastic threaded rod 20a, the plastic ring 20a and the plastic threaded rod 20a are denoted by like reference numerals.

Since the ends 20b of the cut plastic threaded rod 20a are bound to form an annular shape, the bound plastic ring 20a is disposed to be concentric with the reinforcing flange 13. Therefore, by pressing the bound plastic ring 20a in a high-temperature, high-pressure state using the molds 110 and 120, the plastic ring 20a may be bound to be concentric with the reinforcing flange 13.

The plurality of magnetic poles are magnetized in the plastic magnet 20 due to magnetic field anisotropy. The magnetic field anisotropy refers to forming an anisotropic magnet by applying a magnetic field in a process of extruding the plastic magnet 20 and laying ferrite powder in a forward direction.

In addition, a plurality of magnetic poles are magnetized in the plastic magnet 20 due to mechanical anisotropy. The mechanical anisotropy refers to forming an anisotropic magnet by pressing a rubber material using a roller (not illustrated) so that the rubber material has a small thickness, forcibly laying ferrite powder particles in a forward direction, joining the plurality of thin rubber materials, and then performing pressing again.

Since the plastic magnet 20 is formed by mixing synthetic resin, rubber material, and magnetic powder, a magnetic output of the elastic encoder 1 may be maximized by maximizing a ferrite blending amount. In addition, since the rubber material has an elastic force due to its characteristics, cracks and damages of the plastic magnet 20 may be prevented even when an external impact is applied thereto. In addition, since the plastic magnet 20 may be manufactured using an injection process or using a curing process, the size of facilities may be reduced, and the size of molds may be reduced. Such an elastic encoder is formed so that output characteristics thereof are high and a single pitch deviation (SPD) and a total pitch deviation (TPD) are stably maintained.

The rubber material may include one or more of natural rubber (NR), nitrile butadiene rubber (NBR), styrene butadiene rubber (SBR), ethylene propylene diene monomer (EPDM), acrylic rubber (ACM), acrylic ethylene rubber (AEM), ethylene propylene rubber (EPM), fluorocarbon rubber (FPM), fluoro rubber (FKM), vinyl methyl silicone rubber (VMQ), epichlorohydrin rubber (ECO), polyester urethane (PU), hydrogenated nitrile butadiene rubber (HNBR), chloroprene rubber (CR), and chloro sulfonated polyethylene rubber (CSM).

Among the rubber materials, ACM, NBR, and the like may be included in 50 to 250% of conventional plastic resin.

As the magnetic powder mixed with the rubber material, ferrite powder used during manufacture of the elastic encoder 1 may be used without limitations. As the ferrite powder, ferrite powder whose center grain size is about 1 μm may be applied.

When the grain size of the ferrite powder exceeds 1 μm, mixing is facilitated, but a degree of dispersion and marketability of a surface state upon commercialization may be decreased. When the grain size of the ferrite powder is less than 1 μm, a Mooney viscosity of a rubber composition may become too high, mixing may become difficult, and high filling of magnetic powder may become impossible.

The magnetic powder may be included in 600 to 2,100 parts by weight with respect to 100 parts by weight of the rubber material so as to have magnetic characteristics of the elastic encoder 1. An optimal injection amount of the magnetic powder that allows application to a product is a range of 800 to 1,600 parts by weight. Preferably, the magnetic powder may be included in 900 to 1,300 parts by weight.

A sulfur cross-linking agent, a peroxide cross-linking agent, or the like may be used as a cross-linking agent of the plastic magnet 20.

In a high filling combination, 0.5 to 4 parts by weight of sulfur may be used with respect to 100 parts by weight of the rubber material. Using 1 to 2.5 parts by weight of sulfur is preferable in terms of storage stability or the like.

As the peroxide cross-linking agent, for example, alkyl di (tert-butylperoxyisopropyl) benzene, dicumyl peroxide, di-tert-butyl peroxide, and the like may be used.

Cross-linking occurs when 0.5 to 6 parts by weight of the peroxide cross-linking agent is used with respect to 100 parts by weight of the rubber material. Using 1 to 3 parts by weight of the peroxide cross-linking agent is preferable in terms of product flowability and problem of discoloration after vulcanization.

An additive included in the composition of rubber for the elastic encoder may be one or a mixture of two or more selected from the group consisting of a processing aid, an anti-aging agent, a cross-linking accelerator, a plasticizer, a release aid, a dispersant, a coupling agent, and a cross-linking catalyst. Of course, any additive that is generally added in manufacturing the elastic encoder 1 may be used.

As the additive, for example, a processing aid or plasticizer that lower the Mooney viscosity due to high filling during a task of mixing a mixture using a kneader, a banbury mixer, an open mill, or the like, an accelerator and an accelerating agent that increase a cross-linking speed, an anti-aging agent that improve the durability of binder rubber, and the like may be additionally selectively used. Other than the above, a release aid that improves releasability from a surface of a mixing facility, a dispersant that improves dispersion of ferrite particles and various chemicals, a coupling agent that improves a coupling force between ferrite particles and a binder, a catalyst that increases a cross-linking speed of phenol resin, and the like may be used without limitations.

As the additive included in the composition of rubber for the elastic encoder, the processing aid may be used for purposes such as dispersion of filler during first mixing and roll mixing, which are general mixing processes of a rubber composition, rollability, and adjustment of viscosity of a final master batch (FMB).

As the processing aid, a processing aid used during manufacture of the elastic encoder, e.g., fatty acid processing aid or fatty acid ester processing aid, may be used.

0.5 to 16 parts by weight, preferably, 2 to 4 parts by weight, of the processing aid may be used with respect to 100 parts by weight of the rubber material. The rubber composition for the elastic encoder may include an anti-aging agent as an additive.

As the anti-aging agent, in addition to polymerizable 2,2,4-trimethyl-1,2-dihydroquinoline resin, any anti-aging agent having excellent performance which does not participate in cross-linking of the rubber and is commercially available may be used without limitations.

0.5 to 4 parts by weight of the anti-aging agent may be used with respect to 100 parts by weight of the rubber material. Using 1 to 2.5 parts by weight of the anti-aging agent is preferable in consideration of aging resistance of raw rubber.

The rubber composition for the elastic encoder may include, as an additive, a cross-linking accelerator selected from the group consisting of tetramethyl-thiuram disulfide (TMTD), tetraethyl-thiuram disulfide (TETD), dipentamethylene thiuram tertrasulfide (DPTD), 2-mercapto benzothiazole (MBT), dibenzothiazyl disulfide (MBTS), N-cyclohexyl benzothiazyl 2-sulfenamide (CBS), and N-oxydiethylene benzothiazyl 2-sulfenamide (NOB).

The cross-linking accelerator is used to enhance a cross-linking speed in a sulfur cross-linking system or a sulfur-and-peroxide cross-linking system.

0.2 to 4 parts by weight of the cross-linking accelerator may be used with respect to 100 parts by weight of the rubber material. Using 0.5 to 1.5 parts by weight of the cross-linking accelerator is preferable in consideration of discoloration after product cross-linking and a trimming process.

The rubber composition for the elastic encoder may include a plasticizer as an additive.

The plasticizer serves to lower a viscosity during mixing of the rubber composition and improve a mixing state between filler and rubber material.

As the plasticizer, a plasticizer that improves heat-resistance or cold-resistance characteristics, vegetable oil such as rapeseed oil and flaxseed oil, and dioctyl phthalate (DOP) and dioctyl sebacate (DOS), which are universal processing oils, may be used.

3 to 60 parts by weight of the plasticizer may be used with respect to 100 parts by weight of the rubber material. Using 5 to 20 parts by weight of the plasticizer is preferable for normal cross-linking of rubber.

Not only having improved wear resistance and heat resistance, the elastic encoder 1 has improved values of magnetic flux density, pitch deviation, or the like in a specific air gap which are conventional magnetic characteristics.

A method of manufacturing the elastic encoder according to an embodiment of the present invention configured as described above will be described.

Figure 7A:
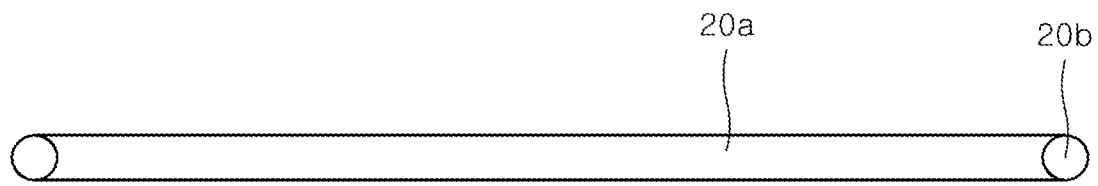
FIGS. 7A to 7C are a view illustrating a process of manufacturing an elastic encoder according to an embodiment of the present invention.
Figure 7B:
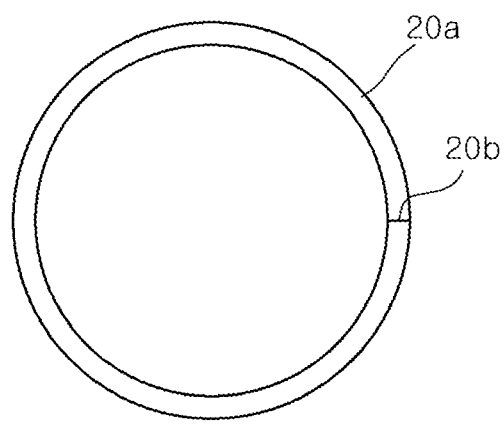
Figure 7C:
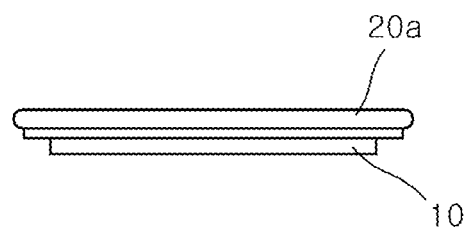
Figure 8:
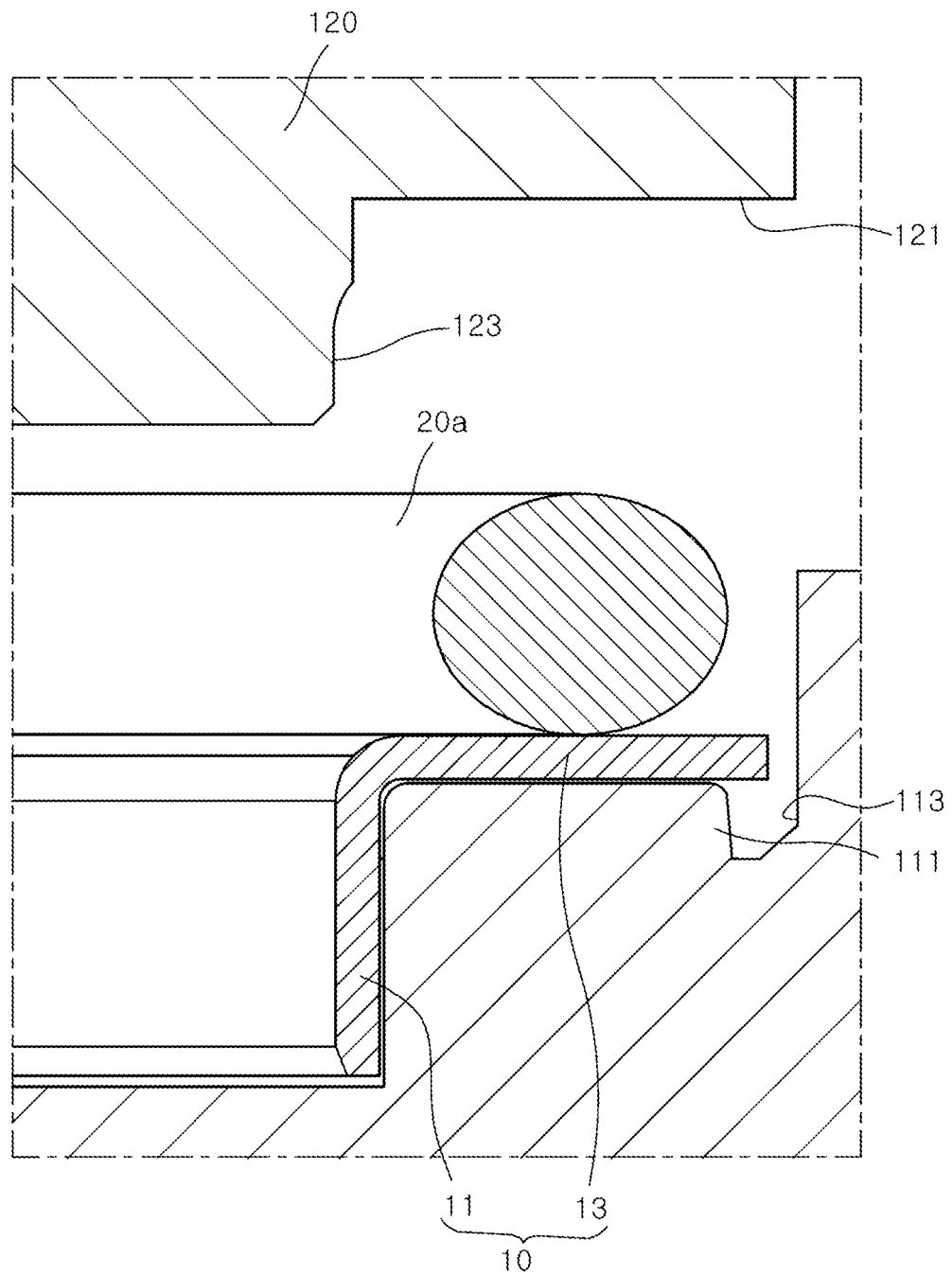
FIG. 8 is a view illustrating a state in which a reinforcing rim and a plastic ring are mounted on a lower mold according to an embodiment of the present invention.
Figure 9:
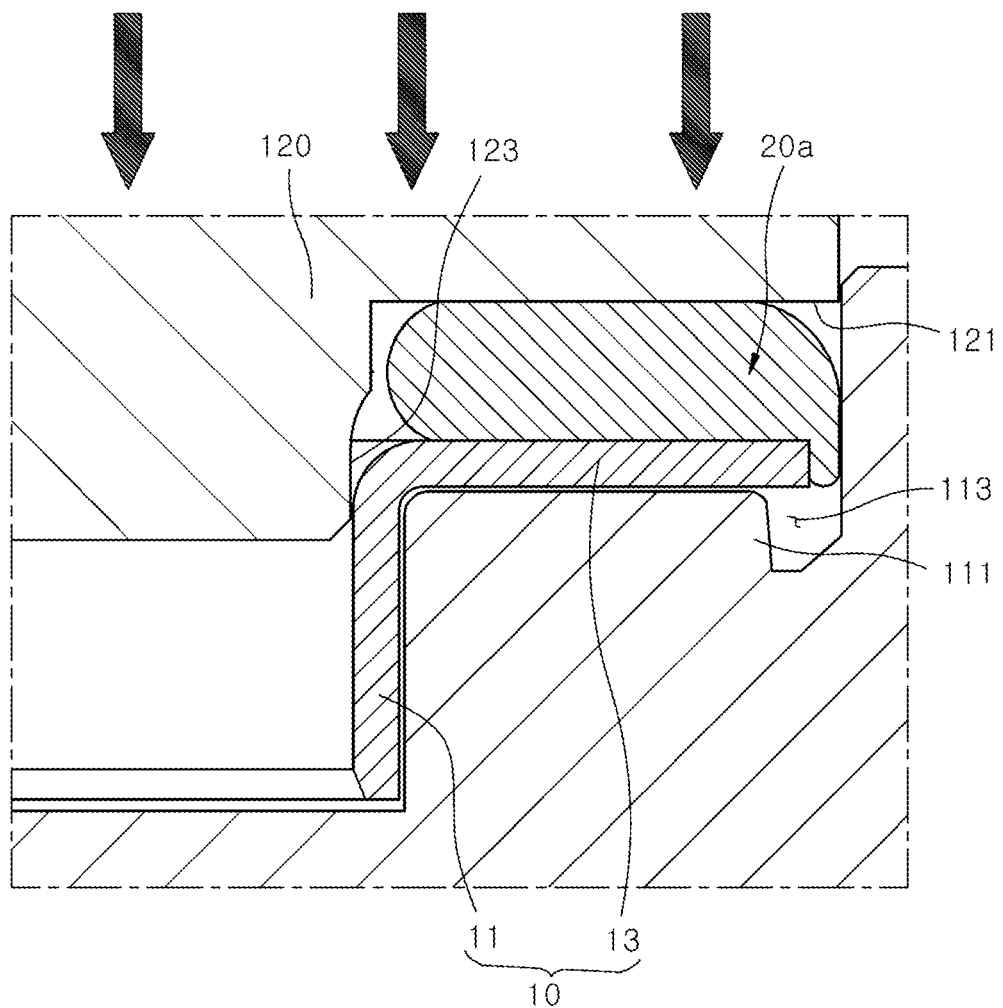
FIG. 9 is a view illustrating a state in which a plastic ring is pressed using an upper mold according to an embodiment of the present invention.
Figure 10:
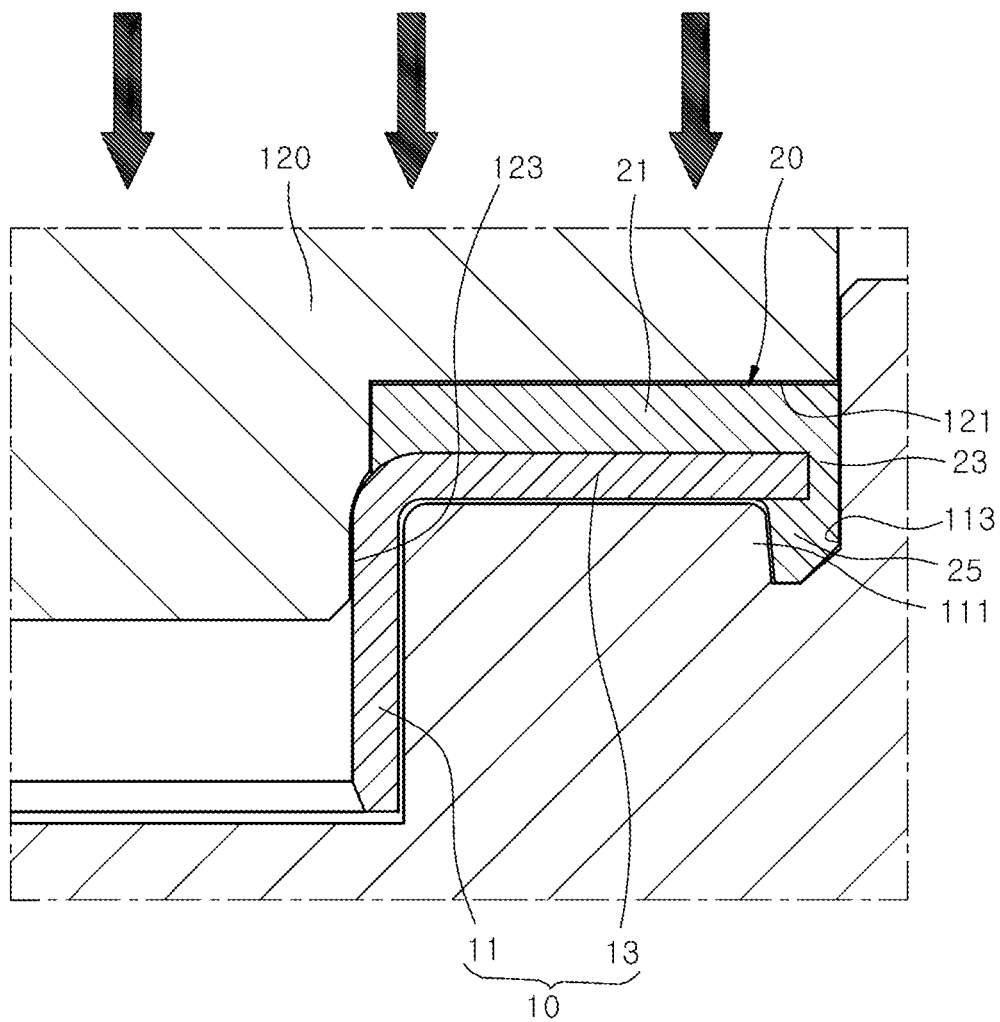
FIG. 10 is a view illustrating a state in which a plastic ring is bound to a reinforcing rim according to an embodiment of the present invention.

FIG. 6 is a flowchart illustrating a method of manufacturing an elastic encoder according to an embodiment of the present invention, FIGS. 7A to 7C are a view illustrating a process of manufacturing an elastic encoder according to an embodiment of the present invention, FIG. 8 is a view illustrating a state in which a reinforcing rim and a plastic ring are mounted on a lower mold according to an embodiment of the present invention, FIG. 9 is a view illustrating a state in which a plastic ring is pressed using an upper mold according to an embodiment of the present invention, and FIG. 10 is a view illustrating a state in which a plastic ring is bound to a reinforcing rim according to an embodiment of the present invention.

Referring to FIGS. 6 to 10, a reinforcing rim 10 is manufactured in an annular shape. The reinforcing rim 10, synthetic resin, rubber material, magnetic powder, additive, reinforcing agent, plasticizer, and the like are prepared, and such materials are stored at a temperature of 20±3° C.

Each prepared material is weighted using an automatic weighting device, and combination is prepared. The weighted materials are mixed under a predetermined temperature condition (S11). In this case, synthetic resin, rubber material, magnetic powder, additive, reinforcing agent, plasticizer, oil, phenol resin, and the like are mixed in predetermined ratios. The mixing process of the rubber material is performed under temperature conditions ranging from 40 to 100° C.

After adding an accelerator to the mixed rubber material and then combining the rubber material, the rubber material is pressed using a roller (not illustrated) (S12). In this case, the pressing process using the roller is performed under temperature conditions ranging from about 60 to 100° C. After putting the pressed rubber material into an extruding device, a plastic threaded rod 20*a* is extruded (S13). The plastic threaded rod 20*a* is formed to have a circular cross-section.

Physical properties and a degree of curing of the plastic threaded rod 20*a* are tested (S14). In this case, the plastic threaded rod 20*a* may be formed to have a wear rate of 3% or less, hardness of 97 or higher, and tensile strength of about 40 kgf/cm$^2$.

The plastic threaded rod 20*a* is cut to a predetermined length (S15). In this case, the plastic threaded rod 20*a* is cut to about a circumferential length of a reinforcing flange 13 of the reinforcing rim 10.

The cut plastic threaded rod 20*a* is stabilized for about 12 hours at a temperature of about 20±3° C. (S16). As the cut plastic threaded rod 20*a* is stabilized, a molecular binding force and a stress state are stabilized.

Ends 20*b* of the plastic threaded rod 20*a* are bound to form a plastic ring 20*a* (S17). The plastic ring 20*a* is formed to have a diameter that is almost the same as a diameter of the reinforcing flange 13. Since the plastic ring 20*a* is a configuration that is formed in an annular shape by binding the ends 20b of the plastic threaded rod 20a, the plastic ring 20a and the plastic threaded rod 20a are denoted by like reference numerals.

In this case, a binding agent may be applied on the ends 20b of the plastic threaded rod 20a, or the ends 20b of the plastic threaded rod 20a may be molten at high temperature and then the ends 20b of the plastic threaded rod 20a may be bound. As the plastic ring 20a is bound in an annular shape, the plastic ring 20a is formed to have a diameter that is similar to that of the reinforcing flange 13 of the reinforcing rim 10.

The reinforcing flange 13 of the reinforcing rim 10 is mounted on a seating part 111 of a lower mold 110, and then the bound plastic ring 20a is placed on an upper surface of the reinforcing flange 13. In this case, since the plastic ring 20a is formed in an annular shape, the plastic ring 20a may be disposed to be concentric with the reinforcing flange 13.

In this case, the lower mold 110 and an upper mold 120 are pre-heated to a temperature at which the plastic ring 20a may be cured and formed in a high-temperature, high-pressure state.

Curing and forming are performed to press the plastic ring 20a and the reinforcing rim 10 in a high-temperature, high-pressure state (S18). In this case, as the lower mold 110 is lowered, a guide wall surface 123 of the lower mold 110 is brought into contact with an inner surface of a reinforcing body 11, and a stepped part 121 of the lower mold 110 is brought into a forming groove part 113 of the lower mold 110.

As the lower mold 110 presses the plastic ring 20a, the plastic ring 20a is deformed while being pushed to both sides. When the lower mold 110 completely presses the plastic ring 20a, the plastic ring 20a is pushed into the forming groove part 113 due to the high temperature and high pressure and is bound to the reinforcing flange 13. As the plastic ring 20a is pushed into the forming groove part 113 and bound to the reinforcing flange 13, the plastic ring 20a is bound to the reinforcing flange 13. In this case, since the upper mold 120 and the lower mold 110 cure and form the plastic ring 20a while the plastic ring 20a is disposed to be concentric with the reinforcing flange 13, the plastic ring 20a is evenly deformed in the circumferential direction of the reinforcing flange 13 and bound to the reinforcing flange 13. Therefore, a defect rate may be decreased when the plastic ring 20a is bound to the reinforcing flange 13.

A plastic magnet 20 is formed by magnetizing the cured and formed plastic ring 20a (S19). In this case, a plurality of magnetic poles are magnetized in the plastic magnet 20 due to magnetic field anisotropy or mechanical anisotropy.

Since a corner part of the reinforcing flange 13 is buried in the plastic magnet 20, the plastic magnet 20 may be tightly adhered and bound to the reinforcing flange 13. Therefore, contact surfaces of the reinforcing flange 13 and the plastic magnet 20, which are formed of different materials, may be prevented from being detached or spaced apart due to a difference in thermal expansion coefficients thereof.

Next, an experimental example of an elastic encoder according to an embodiment of the present invention will be described.

First, output characteristics and pitch deviations of an elastic encoder will be described.

FIG. 11 is a graph illustrating output characteristics and pitch variations of an elastic encoder according to an embodiment of the present invention.

Referring to FIG. 11, it can be seen that, when an air gap of an elastic encoder 1 is 1 mm, since both a negative electrode flux density (Flux density (−)) and a positive electrode flux density (Flux density (+)) are maintained to 15 mT or less at minimum, output characteristics of the elastic encoder 1 are improved.

In addition, it can be seen that, when the air gap of the elastic encoder 1 is 2.13 mm, since a negative electrode single pitch deviation (SPD) is maintained to a ±2% range and a total pitch deviation (TPD) is maintained to 5% or less at maximum, pitch deviations are stably maintained.

Next, a heat resistance characteristic of the elastic encoder will be described.

FIG. 12 is a graph illustrating output characteristics and pitch variations of an elastic encoder on which a heat resistance experiment is performed according to an embodiment of the present invention.

Referring to FIG. 12, first, an elastic encoder 1 is heated in an oven at a temperature of 135±2° C., and in this state, the elastic encoder 1 reaches at least 133° C. The elastic encoder 1 is removed from the oven within 5 seconds. Then, the elastic encoder 1 is dipped in ice water and kept therein for about 3 minutes.

Second, the elastic encoder 1 is aged in a temperature cabinet for 48 hours at a temperature of 130±2° C.

Third, the elastic encoder 1 is aged in the temperature cabinet for 48 hours at a temperature of −40±2° C.

Experimental results of the elastic encoder 1 on which the experiment is performed under the above experimental conditions are as follows.

It can be seen that, when an air gap of the elastic encoder 1 is 1 mm, since both a negative electrode flux density (Flux density (−)) and a positive electrode flux density (Flux density (+)) are maintained to 15 mT or less at minimum, output characteristics of the elastic encoder 1 are improved.

In addition, it can be seen that, when the air gap of the elastic encoder 1 is 2.13 mm, since a negative electrode SPD is maintained to a ±2% range and a TPD is maintained to 5% or less at maximum, pitch deviations are stably maintained.

According to the present invention, since a flexible plastic magnet is bound to a reinforcing flange, an interface binding force of the plastic magnet can be improved. Therefore, a binding force between the plastic magnet and the reinforcing flange can be improved. In addition, since the other surface of the reinforcing flange is smoothly formed, infiltration of foreign substances into a wheel bearing can be prevented by installing a sealing member at the other surface of the reinforcing flange.

In addition, according to the present invention, since the plastic magnet is bound to one surface and a corner part of the reinforcing flange and the corner part of the reinforcing flange is buried in the plastic magnet, the plastic magnet can be tightly adhered and bound to the reinforcing flange. Therefore, contact surfaces of the reinforcing flange and the plastic magnet, which are formed of different materials, can be prevented from being detached or spaced apart due to different thermal expansion coefficients.

In addition, according to the present invention, since a corner binding part and an other surface binding part are formed in a ring shape so as to surround the entire corner part of the reinforcing flange, an outer portion of the plastic magnet can be prevented from being spaced apart from the corner part of the reinforcing flange.

The present invention has been described above with reference to the embodiments illustrated in the drawings, but the embodiments are merely illustrative, and those of ordinary skill in the art to which the present invention pertains should understand that various modifications and other equivalent embodiments are possible from the above-described embodiments.

Therefore, the actual technical scope of the present invention should be defined by the claims below.

What is claimed is:

1. An elastic encoder comprising: a reinforcing rim which has a reinforcing body and a reinforcing flange formed along a peripheral part of the reinforcing body and which is manufactured using a metallic material;
a plastic magnet which is bound to the reinforcing flange so as to surround the reinforcing flange, includes synthetic resin, rubber material, and magnetic powder, and has a plurality of magnetic poles magnetized in a circumferential direction;
wherein the reinforcing body is formed in an annular shape; and
the reinforcing flange extends in a radial direction from an outer surface of the reinforcing body and is formed in an annular shape so as to be concentric with the reinforcing body;
wherein the plastic magnet is bound to one surface and a corner part of the reinforcing flange and the corner part of the reinforcing flange is buried in the plastic magnet;
wherein the plastic magnet includes one surface binding part bound to one surface of the reinforcing flange;
a corner binding part which extends from the one surface binding part and is bound to a corner part of the reinforcing flange; and
an other surface binding part which extends from the corner binding part toward the reinforcing body so that the corner part of the reinforcing flange is buried therein.

2. The elastic encoder of claim 1, wherein:
an inclined surface part is formed at an outer surface of the other surface binding part so that a width of the inclined surface part progressively narrows toward an end of the other surface binding part; and
an adhering part, whose thickness progressively decreases toward the reinforcing body, is formed at an inner surface of the other surface binding part so that the adhering part is adhered to the other surface of the reinforcing flange.

3. The elastic encoder of claim 1, wherein the plastic magnet is formed by extruding a plastic ring, cutting the extruded plastic ring to a circumferential length of the reinforcing rim, binding ends of the cut plastic ring to form an annular shape, placing the annular plastic ring at an upper side of the reinforcing flange, and pressing the annular plastic ring using a mold to bind the annular plastic ring to the reinforcing flange.

4. The elastic encoder of claim 1, wherein a plurality of magnetic poles are magnetized in the plastic magnet due magnetic field anisotropy.

5. The elastic encoder of claim 1, wherein a plurality of magnetic poles are magnetized in the plastic magnet due to mechanical anisotropy.

6. The elastic encoder of claim 1, wherein the rubber material includes one or more of natural rubber (NR), nitrile butadiene rubber (NBR), styrene butadiene rubber (SBR), ethylene propylene diene monomer (EPDM), acrylic rubber (ACM), acrylic ethylene rubber (AEM), ethylene propylene rubber (EPM), fluorocarbon rubber (FPM), fluoro rubber (FKM), vinyl methyl silicone rubber (VMQ), epichlorohydrin rubber (ECO), polyester urethane (PU), hydrogenated nitrile butadiene rubber (HNBR), chloroprene rubber (CR), and chloro sulfonated polyethylene rubber (CSM).

7. A method of manufacturing an elastic encoder, the method comprising:
mixing synthetic resin, rubber material, and magnetic powder;
extruding a plastic threaded rod using an extruding device;
cutting the plastic threaded rod in a circumferential length of a reinforcing rim;
forming a plastic ring by binding ends of the cut plastic threaded rod;
curing and forming the plastic ring and the reinforcing rim using a mold; and
forming a plastic magnet by magnetizing the plastic ring cured and formed in the reinforcing rim.

8. The method of claim 7, wherein a corner part of the reinforcing flange of the reinforcing rim is buried in the plastic magnet.

9. The method of claim 8, wherein the plastic magnet includes:
one surface binding part bound to one surface of the reinforcing flange; a corner binding part which extends from the one surface binding part and is bound to a corner part of the reinforcing flange; and
an other surface binding part which extends from the corner binding part toward the reinforcing body so that the corner part of the reinforcing flange is buried therein.

10. The method of claim 9, wherein:
an inclined surface part is formed at an outer surface of the other surface binding part so that a width of the inclined surface part progressively narrows toward an end of the other surface binding part; and
an adhering part, whose thickness progressively decreases toward the reinforcing body, is formed at an inner surface of the other surface binding part so that the adhering part is adhered to the other surface of the reinforcing flange.

11. The method of claim 7, wherein a plurality of magnetic poles are magnetized in the plastic magnet due magnetic field anisotropy.

12. The method of claim 7, wherein a plurality of magnetic poles are magnetized in the plastic magnet due to mechanical anisotropy.

* * * * *